INVENTOR
HENRY P. KALMUS
HIS ATTORNEY

Nov. 28, 1950     H. P. KALMUS     2,531,689
ELECTRICAL TRANSLATING MEANS AND VARIABLE-INDUCTOR TRANSDUCER THEREFOR
Original Filed June 10, 1943     5 Sheets-Sheet 2
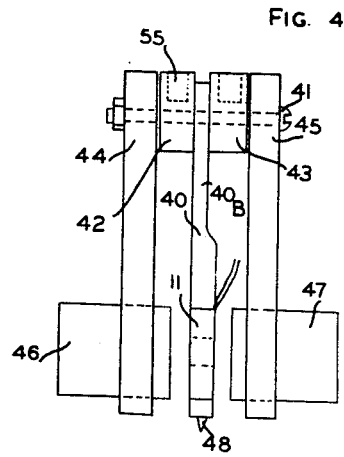
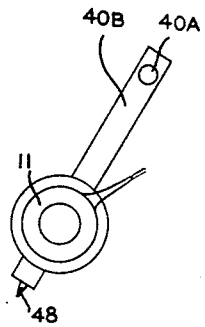
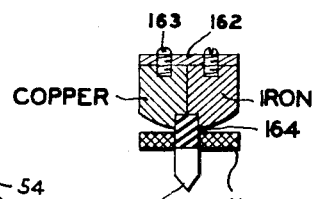
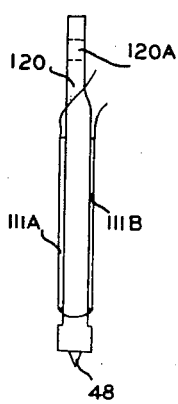
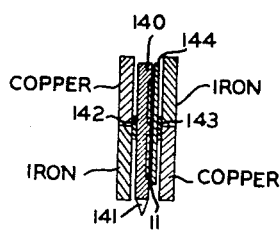
INVENTOR
HENRY P. KALMUS
BY
HIS ATTORNEY Nov. 28, 1950 H. P. KALMUS 2,531,689
ELECTRICAL TRANSLATING MEANS AND VARIABLE-INDUCTOR
TRANSDUCER THEREFOR
Original Filed June 10, 1943 5 Sheets-Sheet 3

INVENTOR
HENRY P. KALMUS
BY
HIS ATTORNEY

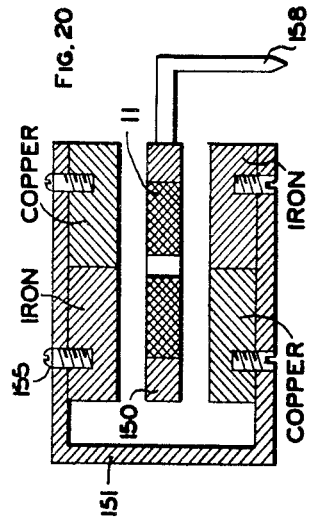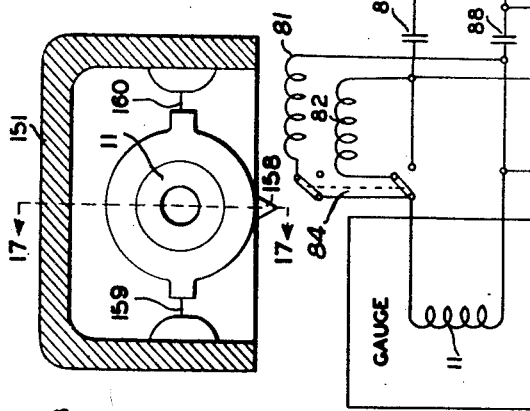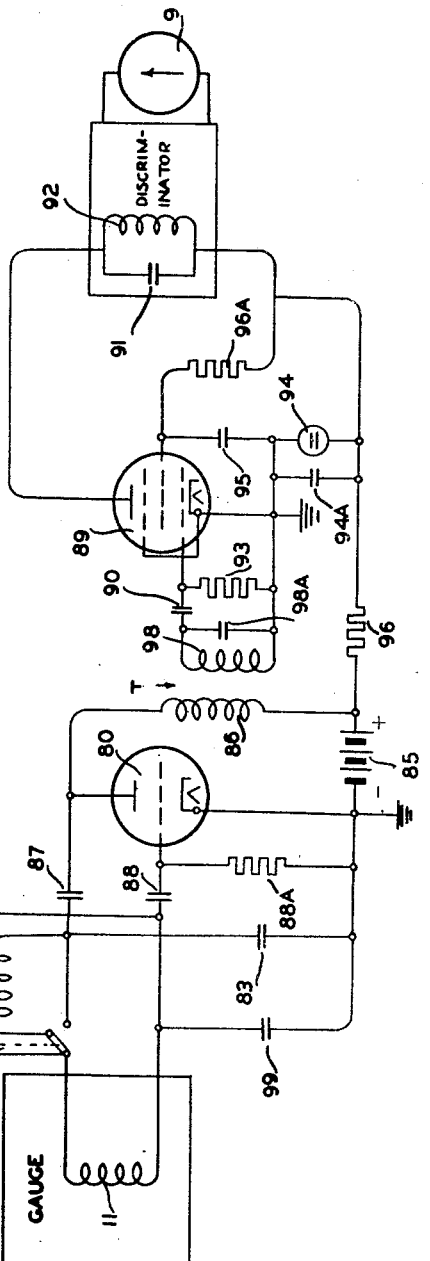
INVENTOR
HENRY P. KALMUS
HIS ATTORNEY

Nov. 28, 1950 — H. P. KALMUS — 2,531,689
ELECTRICAL TRANSLATING MEANS AND VARIABLE-INDUCTOR TRANSDUCER THEREFOR
Original Filed June 10, 1943 — 5 Sheets-Sheet 5

INVENTOR
HENRY P. KALMUS
BY *[signature]*
HIS ATTORNEY

Patented Nov. 28, 1950

2,531,689

UNITED STATES PATENT OFFICE 2,531,689

ELECTRICAL TRANSLATING MEANS AND VARIABLE-INDUCTOR TRANSDUCER THEREFOR

Henry P. Kalmus, Chicago, Ill., assignor to Zenith Radio Corporation, a corporation of Illinois Original application June 10, 1943, Serial No. 490,296, now Patent No. 2,473,650, dated June 21, 1949. Divided and this application July 12, 1947, Serial No. 760,676

18 Claims. (Cl. 332—2)

This application is a division of the copending application Serial No. 490,296 filed June 10, 1943, now issued as U. S. Patent 2,473,650, dated June 21, 1949, to the present applicant and assigned to the same assignee as the present application.

This invention relates to a variable inductance coil particularly useful with apparatus wherein it is desired to produce predetermined inductance variations as the coil is moved or to vary the resonant frequency of a circuit in a predetermined manner in accordance with movement of the inductance coil.

In many instances it is desirable to move an element of an electrical circiut and to produce linear electrical variations in the circuit in accordance with linear movement of the element. This is particularly true in frequency modulation apparatus wherein the element may form one element of a tuned circuit, and especially where it is desired that linear movement of the element should cause linear changes in resonant frequency of a circiut over a range corresponding to the range traversed by the instantaneous intensity of a signal in accordance with which there is displacement of such element.

In a phonograph pickup unit it is desirable in many instances to reproduce lateral, or hill and dale, recordings by varying the operating frequency of an associated electrical circuit. In that case the instantaneous resonant frequency of the circuit should bear a linear relationship to the amount of lateral, or hill and dale, displacement of a stylus in a groove of the recording.

Still another problem is that laterally cut recordings may be reproduced when they are mounted eccentrically on the rotating spindle and hill and dale recordings may be reproduced when the recording is in a warped condition. In such cases where the reproducing, or tone, arm translates the record groove undulations into a frequency change, very large changes of frequency may be produced at a low speed or at a low frequency less than 100 cycles, by such eccentricity or warping. Such large, low frequency, frequency deviations are undesirable primarily because of limitations in most frequency modulation reproducers, which commonly include a frequency deviation responsive device or frequency discriminator which produces a voltage whose instantaneous intensity is linearly proportional to the instantaneous frequency deviation of a wave, but only over a limited frequency range. It is therefore desirable that the effect of such eccentricity or warping upon the frequency deviation produced by the tone arm should be eliminated.

In most instruments, for instance, in gauges, electric meters, etc., it is usually desirable that the indication of the instrument bear a linear relationship to the quantity being measured so that the instrument may be easily calibrated or indications thereof interpolated or extrapolated.

In a frequency modulation system having a microphone responsive to sound intensities, the response of the microphone should vary in a predetermined manner with the amplitude of sound variations impressed thereon, as otherwise there is loss of fidelity.

An object of my invention is to provide a new and improved phonograph pickup.

It is also an object of my invention to provide an improved element in a resonant circuit, in which the displacement of the element produces corresponding substantially linear change in resonant frequency of the resonant circuit.

Another object of this invention is to provide an improved method and apparatus for use in a gauge.

Still another object of this invention is to provide an improved method and apparatus for use in telemetering.

Another object of this invention is to provide an improved microphone.

Another object of my invention is to provide an improved phonograph pickup not only for use with records which are laterally cut but also with records having hill and dale impressions thereon, said pickup being non-responsive to hill and dale variations when used for reproducing laterally cut records and vice versa.

Another object of this invention is to provide an improved phonograph pickup unit incorporating combined inductance and capacitance changing means.

Another object of this invention is to provide an improved position responsive inductance unit having means associated therewith for assuring predetermined changes in inductance for corresponding changes in the position of the inductance unit.

The features of my invention which I believe to be novel are set forth with particularity in the appended claims. My invention itself, both as to its organization and manner of operation, together with further objects and advantages thereof, may best be understood by reference to the following description taken in connection with the accompanying drawings in which:

Figure 4 is a practical embodiment of one form of my invention;

Figure 5 is a side view in elevation of a portion of the apparatus shown in Figure 4;

Figure 6 shows a phonograph pickup embodying the invention;

Figures 8 and 9 show my invention embodied in an improved gauge;

Figure 12 shows a modified inductance unit;

Figure 13 shows another practical embodiment of my invention;

Figure 14:
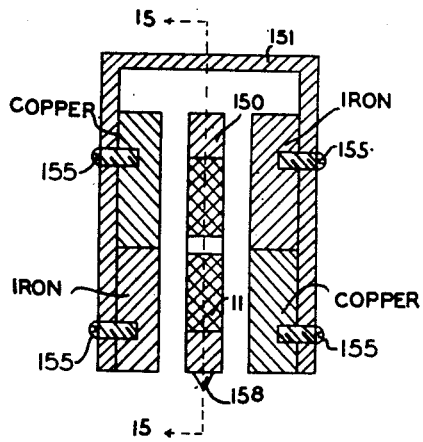
Figure 15:
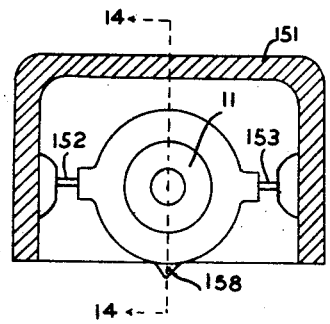
Figure 16:
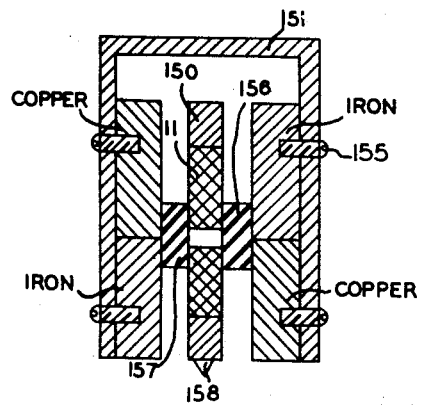
Figure 17:
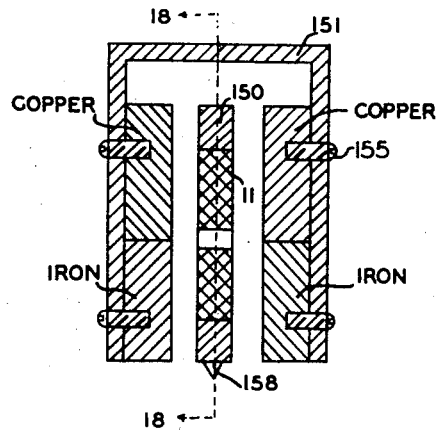
Figures 21, 22:
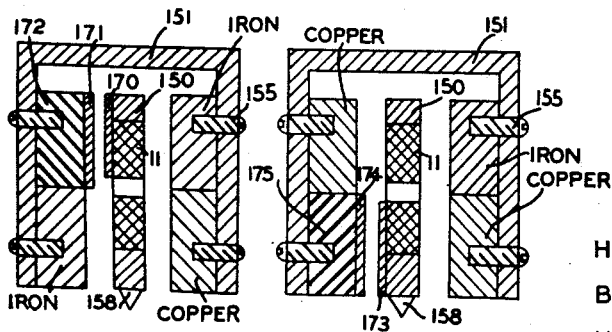

Figures 14 and 15 show still another embodiment of my invention, Figure 14 being a sectional view on line 14—14 of Figure 15 and Figure 15 being a sectional view taken on line 15—15 of Figure 14;

Figure 16 is a modification of the unit shown in Figures 14 and 15 embodying my invention;

Figures 17 and 18 show yet another embodiment of my invention, Figure 17 being a sectional view taken substantially on line 17—17 of Figure 18 and Figure 18 being a sectional view taken substantially on line 18—18 of Figure 17;

Figure 19 is a sectional view taken through the center of another phonographic pickup unit embodying my invention; and Figures 20, 21 and 22 show still other embodiments of my invention.

Figure 1:
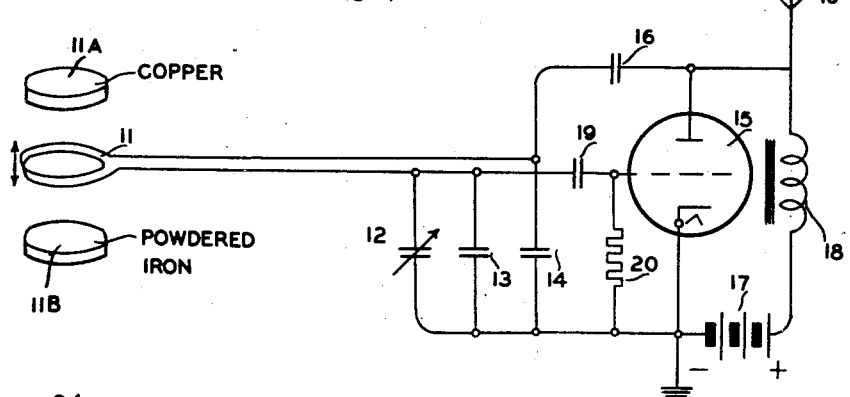
Figure 1 shows apparatus embodying the principle of my invention.
Figure 2:
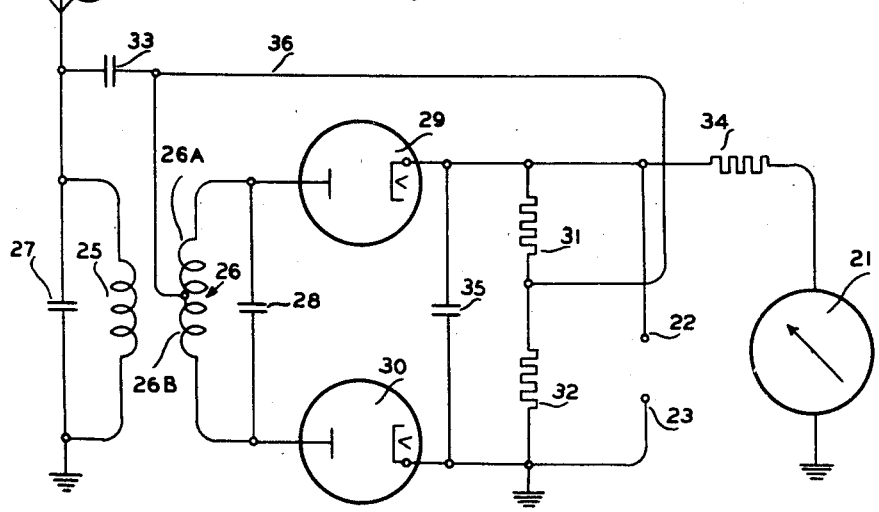
Figure 2 shows apparatus for receiving signals sent in accordance with my invention.

Referring to the drawings wherein like reference numerals designate like parts in all figures, Figure 1 shows a radio frequency transmitter adapted to transmit frequency modulated signals to a frequency modulation receiver, such as that shown in Figure 2. The frequency of the wave transmitted from antenna 10 is determined by the reactances of the oscillator resonant circuit including inductance 11 in parallel with a circuit in which parallel connected capacitances 12 and 13 are in series with capacitance 14. The discharge device 15 is connected in a modified Colpitts oscillator circuit.

It is apparent that, if the inductance of coil 11 is varied, the frequency of oscillation is also varied. Variable capacitance 12 serves as a trimming capacitance for setting the oscillator at a predetermined frequency, about which it varies as the inductance 11 is caused to vary. Coupling capacitance 16 serves to maintain one terminal of the previously described resonant circuit at the high frequency potential of the anode of discharge device 15, while blocking the flow of continuous current from the anode to the grid, or control electrode. The other terminal of the resonant circuit is connected through condenser 19 to the grid of device 15 and the cathode is connected between capacitances 13 and 14. Energy is supplied to the oscillator from voltage source or battery 17 which is connected in a series circuit with choke coil 18 between the anode and cathode of discharge device 15. The antenna 10 is connected directly to the anode of discharge device 15 and radiates energy having a frequency determined by the resonant circuit heretofore described.

In the frequency determining circuit the coil 11 is made with a small inductance and the capacitances 12, 13 and 14 are of relatively high capacity, the two reactances resonating at the frequency of the wave transmitted. Capacitances 12, 13 and 14 are purposely made large so that the effects of varying amounts of stray capacitance are relatively small, as when the coil 11 is touched or moved manually. Resistance 20 connected between the grid and cathode of discharge device 15 serves to maintain the grid of tube 15 at a definite direct potential with respect to its cathode and thus stabilizes the operation of the discharge device. Coil 11 is adapted to move, as indicated by the arrows in Figure 1, with respect to the copper and powdered iron discs 11A and 11B in a manner hereinafter described.

The apparatus shown in Fig. 2 serves as a receiver and frequency discriminator for frequency modulation signals, which are received from antenna 10 in Fig. 1. Continuous currents proportional to frequency changes in the mean frequency of the carrier wave transmitted from antenna 10 are indicated by direct current meter 21 and alternating voltages of amplitude corresponding to the frequency of changes in the carrier frequency appear across the terminals 22 and 23.

The particular receiver or discriminator circuit shown in Fig. 2 is similar to one of a well-known type, described on page 197 of "Frequency Modulation" by A. Hund, McGraw-Hill Book Company, Inc., 1942. In brief, frequency modulation signals are received by antenna 24 and are impressed across a radio frequency transformer having a primary winding 25 and a secondary winding 26 tuned respectively by capacitances 27 and 28 to the mean or carrier frequency about which there are excursions of instantaneous carrier frequency. Coils 25 and 26 are loosely coupled and are excited at the frequency at which the oscillator of Fig. 1 operates when coil 11 is in its normal, or undisplaced, position. At that frequency, the voltage appearing across coil 25 is 90° out of phase with the voltage appearing across coil 26.

The purpose of the receiver or discriminator is to produce signals of amplitude corresponding to frequency variations imposed upon the carrier frequency in response to motion of coil 11 which changes the carrier from its means frequency. In order to cancel out effects due to amplitude variations of the carrier, the receiver or discriminator is made differentially acting by supplying a voltage, substantially in phase with the voltage appearing across coil 25, to the center tap of secondary winding 26. This in practice is done by connecting capacitance 33 of low reactance between antenna 24 and the center tap of winding 26. With this connection, and with the cathode of diode 29 grounded for high frequency currents through capacity 35, a voltage appears across diode 29 which is equal to the vectorial sum of the voltage between antenna 24 and ground and half the 90° voltage induced in coil 26. The opposite ends of coil sections 26A and 26B are connected respectively to the anodes of diodes, or unidirectionally conducting devices, 29 and 30. The cathodes of rectifier devices 29 and 30 are grounded for high frequency currents, due to the fact that capacitance 35, of low reactance at the carrier or mean frequency, is connected between the cathodes and to ground. Also, the cathodes of rectifier or discharge devices 29 and 30 are connected in a series circuit including the equal resistances 31 and 32. Lead line 36 connected between the center tap of coil 26 and the connection between resistances 31 and 32 represents a low resistance path for direct current flow between the output elements of the discharge devices 29 and 30.

With the balanced circuit thus far described it is clear that, when a signal is applied to antenna 24 with a frequency corresponding to the unmodulated carrier or mean frequency, the unidirectional rectified potentials appearing across equal resistances 31 and 32 are equal and are of such polarity that their net effect is zero on a continuous current meter 21, which is connected in parallel with the series circuit including those equal resistances. Resistance 34 in series with meter 21 serves to decrease the sensitivity of meter 21.

When a carrier wave of shifted frequency is received on antenna 24, the rectified direct potentials appearing across resistances 31 and 32 are of unequal intensity and their net effect is to cause current to flow through meter 21 in a degree and direction depending upon the degree and direction of frequency shift of the carrier wave.

The inductance of coil 11 in Fig. 1 depends upon its position with respect to the discs of copper and powdered iron. Correspondingly, the frequency of radiation transmitted by antenna 10 is dependent upon the position of coil 11. The receiver and discriminator shown in Fig. 2 is so balanced that no current flows in meter 21 when coil 11 is equidistant from the copper disc and the powdered iron disc shown in Fig. 1. Displacements of coil 11 from the equidistant position cause corresponding deflections on instrument 21.

One of the main objects of this invention is to provide an inductance coil which changes in inductance in a predetermined manner with its displacement. This is accomplished by mounting the coil so that its magnetic field encompasses a member having magnetic permeability greater than air and also encompasses a member having low resistance for the flow of electric current. In the absence of the powdered iron disc shown in Fig. 1, as coil 11 moves toward the copper disc, the effective inductance of coil 11 decreases. In the absence of the copper disc shown in Fig. 1, as the coil 11 moves toward the powdered iron disc, the effective inductance of coil 11 increases. Changes in effective inductance of coil 11 cause corresponding changes in frequencies transmitted by antenna 10.

Figure 3:
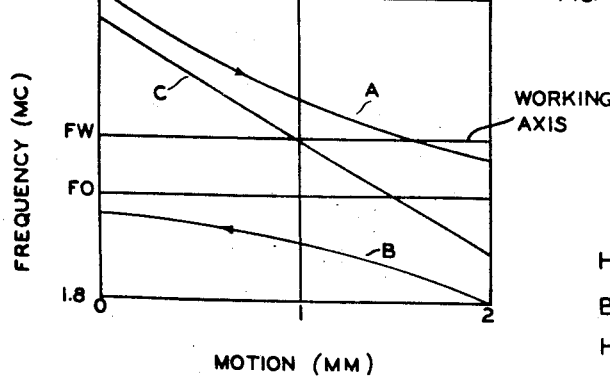
Figure 3 is a graphical representation of certain characteristics of my invention.

This behavior is best illustrated in Fig. 3 wherein curve A represents the variation of transmitted frequency, in the direction of the arrow, when coil 11 is moved away from the copper disc, the powdered iron disc being absent. Curve B represents the variation of transmitted frequency, in the direction of the arrow, as the coil 11 is moved away from the powdered iron disc, the copper disc being absent. Ordinate FO represents the frequency of transmission when both the copper disc and the powdered iron disc are absent. Curve C represents the variation of transmitted frequency when both copper and powdered iron discs are present and when coil 11 is moved relative to both the copper disc and powdered iron disc. Ordinate FW represents the carrier, or mean, frequency at which the transmitter in Fig. 1 normally operates when coil 11 is in its normal or undisplaced position, and the meter 21 in Fig. 2 reads "zero."

When interpreting Fig. 3 it is helpful to bear in mind that, when coil 11 is moved toward one of the discs (either copper or powdered iron), it moves away from the other disc. Curves A and B in Fig. 3 are non-linear and curve A has a positive curvature, whereas curve B has a negative curvature about equal in magnitude to the positive curvature of curve A. That is, when only one of the discs is employed the antenna 10 radiates frequencies not linearly proportional to displacement of coil 11, and that non-linear proportionality is opposite for the two members 11A and 11B. However, when both the copper disc 11A and the powdered iron disc 11B are used, linear movements of coil 11 cause corresponding substantially linear changes in frequency of the wave radiated by antenna 10. Of course, every physical inductance coil possesses the properties of inductance and resistance. The magnitude of both of these properties of the coil are affected by the presence in the alternating magnetic field thereof of bodies possessing either magnetic or electricity conducting properties. That is, when a body such as copper is disposed in the alternating magnetic field of the inductance coil, due to the flow of eddy currents, the inductance of the coil is reduced but the effective resistance of the coil is increased and, consequently when and as the coil moves away from the copper body the coil inductance is increased but the effective coil resistance is decreased. Also, when a body such as a powdered iron core is disposed in the alternating magnetic field of the inductance coil, due to the permeability and hysteresis loss in the iron core, the inductance of the coil as well as its resistance is increased and, consequently when and as the coil moves away from the iron core the coil inductance as well as the coil resistance is decreased. With these fundamental principles in mind, it is noted that in each one of the embodiments of my invention shown herein, where there is relative movement between an inductance coil and means (magnetic and copper bodies) possessing both magnetic and electricity conducting properties, the inductance is increased or decreased as the case may be depending upon the direction of relative movement, in a cumulative manner, but the effective resistance being changed in a differential manner tends to remain substantially constant during such relative movement. Inasmuch as the effective resistance of the relatively movable coil tends to remain constant, the modulation of the oscillator circuit including said coil is predominantly of the frequency type and the amount of amplitude modulation is much less than that which would be present if either the copper or the powdered iron were taken out of the magnetic field of the coil. Hence, the present apparatus has the advantage that an amplitude limiting device of the type shown with similar apparatus in the copending application of Chalon W. Carnahan, Serial Number 406,431, filed August 11, 1941, now U. S. Patent No. 2,444,218, dated June 29, 1948, and assigned to the same assignee as the present application, is no longer deemed necessary for good reproduction of recordings and hence such limiting device is not shown herein in the phonograph arrangements.

Fig. 4 shows a practical construction embodying my invention. A circular inductance coil 11 is snugly held in a recess in vibratile element 40, which has a hole 40A (see Fig. 5) therethrough for the passage of threaded bolt 41, which bolt rigidly joins spacers 42 and 43 and the ends of parallelly extending support members 44 and 45 with the vibratile element 40. One of the parallelly extending members 44 has a circular opening through its free end adapted to embrace and hold a solid copper cylinder 46. The other parallelly extending member 45 has a similar cylindrical opening through its free end adapted to embrace and hold a solid cylinder 47 of powdered iron, such as is commonly formed of iron particles cemented with a suitable binder. The copper cylinder 46, circular coil 11 and cylindrical iron core 47 are mounted coaxially. The vibratile element 40, parallelly extending members 44 and 45, and spacers 42 and 43 may be of polystyrene or other similar plastic material. Vibratile element 40 is made sufficiently long and of such small cross section so as to follow undulations in a laterally cut phonograph record when the stylus 48 traverses the groove of the laterally cut phonograph record. In other words, the arm 40 is made inherently flexible and resilient enough to allow movement of inductance coil 11 relative to the cylinders 46 and 47.

As seen from Figs. 4 and 5, the vibratile element 40 has a portion 40B of reduced cross section so that the vibratile element has a large compliance for horizontal movement of the element 40 in Fig. 4 and a small compliance for movement of the stylus 48 transverse to the plane of the paper in Fig. 5. Thus, the arm 40, due to its shape, responds more readily to laterally cut undulations in a phonograph record than to hill and dale cut undulations in the same phonograph record.

Fig. 6 shows a tone arm in which the vibratile inductance unit shown in Figs. 4 and 5 may be mounted. The tone arm proper of Fig. 6, in conventional manner, is mounted for pivotal movement about a pivot (not shown), so that it may freely move across a record toward its center as the stylus 48 moves in a convolution or spiral groove of a record R. The tone arm shown in Fig. 6 comprises rigid supporting member 51, which rotates around the vertical pivot (not shown) in conventional manner, and a filter element 52 connecting the supporting member 51 to a head 53. Head 53 encloses the variable inductance unit shown in Fig. 4. The unit shown in Fig. 4 may be fastened to the head 53 by means of screws 54, which are threaded in tapped holes 55 (Fig. 4) in the spacers 42 and 43.

In this embodiment of my invention the filter element 52 comprises a thin strip of metal lying in a vertical plane and having its opposite ends rigidly fixed to member 51 and head 53, respectively. The compliance of filter element 52 bears definite relationship to the compliance of vibratile element 40, as is hereinafter explained.

The vibratile element 40 is stiff enough, the filter element 52 is weak enough, so that, taken with the mass of head 53, when the vibratile element 40 oscillates horizontally in Fig. 4 at a frequency less than a predetermined low frequency, for example, 100 cycles per second, the head 53 moves with respect to member 51 at the corresponding low frequency without relative movement between vibratile element 40 and parallelly extending members 44 and 45 (see Fig. 4) carried by head 53. When the vibratile element 40 moves laterally in Fig. 4 at a rate greater than the predetermined low frequency, the filter element 52 has not sufficient compliance and mass of head 53 is too great to allow head 53 to move with respect to member 51 and, as a consequence, the vibratile element 40 moves relative to the parallelly extending members 44 and 45 carried by head 53 at frequencies above the predetermined low frequency.

Thus, by proper design of vibratile element 40, head 53, and filter element 52, frequencies corresponding to "wow" frequencies encountered in playing phonograph records are substantially eliminated without loss of fidelity.

With the tone arm construction shown in Figs. 4–6, hill and dale imperfections in a record cause little effect on the inductance of coil 11, since the vibratile element 40 is much more flexible for lateral movement of the element 40 in Fig. 4 than for movement transverse to the plane of the paper in Fig. 5, and since substantially equal and opposite inductance changes are produced in coil 11 by the presence of copper cylinder 46 and powdered iron cylinder 47 as a result of movement of the vibratile element 40 in a direction corresponding to hill and dale undulations. The mechanical filter arrangement per se is disclosed and claimed in my parent application, Serial No. 490,296, filed June 10, 1943, and assigned to the same assignee as the present application.

Since the frequency determining circuit including coil 11 is of the high capacity type, substantial changes of stray, or body capacitances have little effect on the frequency of the wave transmitted. Consequently, if desired, some or all of the elements shown in Fig. 1 may be mounted in the tone arm head 53. The size of present day vacuum tubes or discharge devices permits the tube or device 15 of Fig. 1 to be mounted in the head of a tone arm, along with a high capacity tuned circuit, similar to the one shown in Fig. 1.

Figure 7:
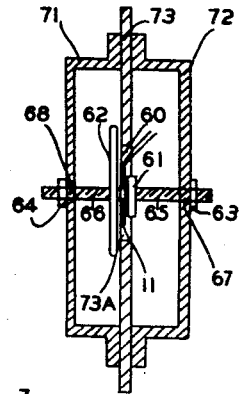
Figure 7 shows a section through a microphone embodying my invention.

Fig. 7 shows my invention embodied in a microphone. Coil 11, rigidly mounted, for example, by gluing, on diaphragm 60, which moves in response to sound waves impinging thereon, is disposed between adjustable powdered iron disc 61 and adjustable copper disc 62 in accordance with the principles heretofore described in connection with Fig. 3. Movements of diaphragm 60 are reflected as changes in effective inductance of coil 11. The spacing of the iron disc 61 and copper disc 62 may be adjusted by loosening the respective lock nut 63 or 64 and turning the corresponding screw threaded mounting member 65 or 66 in threaded portions 67 and 68 of dished circular covers 71 and 72. Flexible diaphragm 60 is circular and is held in cooperating circular opening 73A of ring 73, which ring is held in clamped position between covers 71 and 72. Diaphragm 60 is fastened to ring shaped member 73 by gluing or other suitable means. The coil 11 of Fig. 7 may be connected so as to modulate the frequency of a transmitter as shown in Fig. 1 in response to the impingement of sound waves.

Figure 8:
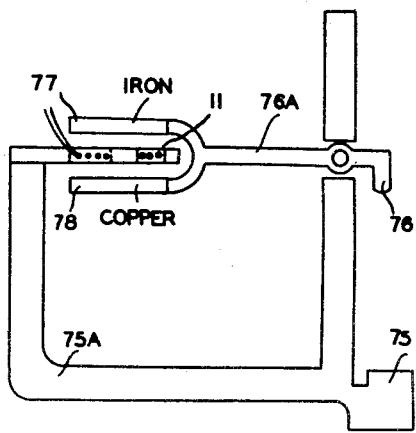

Fig. 8 shows my invention embodied in a gauge. The gauge has a fixed base 75 adapted to hold a test piece (not shown), whose size corresponds very nearly to the distance between the base 75 and a pivoted gauge finger 76. An extension 76A is integrally formed with the gauge finger 76, and is forked so as to hold iron disc 77 and copper disc 78 in spaced relationship with inductance coil 11 therebetween. Coil 11 is fastened to an extension 75A of fixed base 75. In this instance the coil 11 is fixed and the iron disc 77 and copper disc 78 move jointly relative to the coil 11. In accord with principles heretofore described, displacements of finger 76 are accompanied by predetermined changes in the inductance of coil 11.

Fig. 9 shows an electrical circuit for indicating changes in the inductance of coil 11 in the gauge arrangement shown in Fig. 8. The inductance coil 11, whose effective inductance is varied by displacement of the gauge finger 76, is included in the frequency determining circuit of a modified Colpitts oscillator. The frequency of oscillating currents set up in in discharge device 80 is determined substantially by the reactances of the resonant circuit including inductances 11, 81 and 82 and series capacitances 83 and 99, when the switch 84 is in the position shown in Fig. 9.

In the circuit shown in Fig. 9, provision is made for varying the sensitivity of the gauge by moving switch 84. The inductance units 11, 81 and 82 are so designed that the average frequency of oscillating current in the discharge device 80 (that is, the frequency when coil 11 is in normal position) is not affected by the position of switch 84. When switch 84 is in the lower position, engaging the lower contacts, the frequency of oscillating currents in discharge device 80 is determined substantially by the resonant circuit including only the inductance 11 and capacitances 83 and 99.

When switch 84 is in the upper position, as shown in Fig. 9, whereby inductance coil 81 is connected in parallel with variable inductance 11 and in series with inductance 82, with series capacitances 83 and 99 in parallel with inductances 11, 81 and 82, the gauge is less sensitive than when the switch 84 is in the downward position. This is so because, when inductance 11 is connected in series with inductance 82, small changes in inductance 11 produce small changes in the total net inductance of the resonant circuit; whereas when switch 84 is in its downward position, inductance 11 is the only inductance in the circuit, and similar small changes in inductance 11 are accompanied by larger changes in the frequency of oscillatory current in discharge device 80.

Power is supplied to the discharge device 80 from a source 85 of operating current, that source being connected between the cathode and anode of discharge device 80 through the primary 86 of transformer T.

Coupling capacitance 87, connected between the anode of discharge device 80 and a terminal of either one of the two resonant circuits heretofore described (the particular connection being determined by the position of switch 84), serves to maintain the anode of discharge device 80 at the high frequency potential of that terminal of the connected resonant circuit.

Coupling capacitance 88, connected between the grid of discharge device 80 and the other terminal of the connected resonant circuit, serves to maintain that grid at the high frequency potential of that other terminal.

Grid resistor 88A, connected between the grid of discharge device 80 and its cathode, serves to maintain the direct current potential of the grid of discharge device 80 at a negative potential, so as to assure proper operation of discharge device 80. The cathode of device 80 is connected between condensers 83 and 99 and is thus maintained at a high frequency potential intermediate the potentials at the terminals of the resonant circuit which is connected between the anode and grid of device 80.

It is important to note that the frequency of the oscillating current in the primary 86 of transformer T is not affected by the position of switch 84, when coil 11 is equidistant from its associated powdered iron and copper discs. That is, the mean frequency of oscillating currents in primary 86 of transformer T is not affected by the position of switch 84. The sensitivity of the gauge is, however, affected by the position of switch 84, which may be in either one of two positions.

The secondary 98 of coupling transformer T is tuned to the mean frequency by means of capacitance 98A, and the voltage appearing across the tuned secondary 98 is applied between the grid of discharge device 89 and its cathode through serially connected coupling capacitance 90.

Discharge device 89 with its associated circuit is an amplitude limiter. The wave from transformer T, transmitted through discharge device 89 and its associated circuit, appears across the output resonant circuit including capacitance 91 and the inductance 92, and is constant in amplitude or intensity regardless of the variations in voltage applied between the grid and cathode of discharge devcie 89. That is, the device 89 is adjusted so that it operates between anode current cutoff and maximum anode current when a wave is impressed on the grid of device 89.

This is accomplished by applying suitable direct potentials to the control grid and screen grid of the discharge device 89. Suitable bias potential is supplied to the control grid by virtue of rectified current flowing through grid resistor 93, which is connected between the control grid and cathode of device 89, so that when voltages of peak-to-peak amplitude above a certain predetermined threshold value are induced in the secondary winding 98 of transformer T, negative half cycles of the wave impressed on the grid make the grid sufficiently negative with respect to the cathode that anode current is stopped. The screen grid and anode of discharge device 89 are maintained and stabilized at a relatively low constant potential by means of glow discharge tube 94, resistance 96, and condenser 94A, so that, on the positive half cycles of the wave impressed on the grid of device 89, the anode current reaches a maximum intensity beyond which it cannot increase.

Capacitance 95 connected between the screen grid of discharge device 89 and the cathode is of low reactance at carrier frequencies and serves as an effective short circuit for currents of high frequency. Power is supplied to discharge device 89 from voltage source 85 which is connected between the anode and cathode of discharge device 89 through a series circuit including resistance 96 and the parallel tuned circuit 91, 92. The screen grid of discharge device 89 is maintained at a constant low direct potential by applying the voltage drop across the glow discharge device 94 between the screen grid and cathode of the discharge device through serially connected voltage dropping resistance 96A. One important feature of this invention is that in the high sensitivity gauge disclosed only the screen and anode voltages on the limiter tube 89 need be stabilized.

The discriminator in Fig. 9, including coil 92 and condenser 91, is shown in block form. The discriminator shown in Fig. 2 may be employed with the circuit shown in Fig. 9. That is, inductance coil 92 may be coupled to the center tapped coil 26 with the capacitance 33 (Fig. 2) connected to the anode of discharge device 89 instead of to the antenna 24 as in Fig. 2. A direct current meter 97 similar to direct current meter 21 of Fig. 2 gives an indication representative of the deviation from mean frequency of the alternating current in the resonant circuit of which inductance 11 forms a part. Since a discriminator of the type shown in Fig. 2 gives an indication on its associated direct current meter in substantial linear proportional relationship to changes from mean frequency, and since the movement of coil 11 produces linear changes in frequency, the meter 97 has substantially a linear scale. That is, equal displacements of coil 11 in the gauge device are accompanied by substantially equal changes in displacement of the pointer on meter 97, and for that reason only a few experimental points are necessary to calibrate the apparatus shown in Fig. 9.

Figure 10:
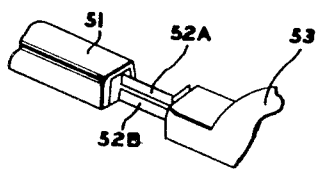
Figure 10 shows a modified form of the phonograph pickup of Figure 6.

Fig. 10 shows a modified filter element of the type shown in Fig. 6. The filter elements 52A and 52B, each approximately of one-half the width of filter element 52 in Fig. 6, mechanically join the head 53 to the tone arm extension 51, so as to produce exactly the same mechanical effect as element 52. In addition, the mechanical filter elements 52A and 52B are supported in spaced relationship to one another so that they form a pair of electrical current conductors for the passage of current through the inductance coil 11 in the tone arm head 53.

Figure 11:
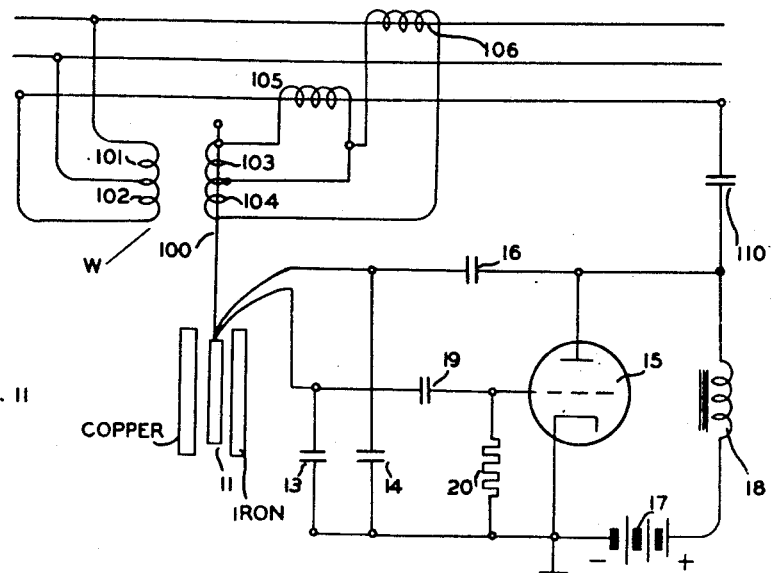
Figure 11 shows my invention embodied in a telemetering arrangement.

Fig. 11 shows my invention embodied in a telemetering arrangement. In this embodiment, signals representative of power are transmitted over a three-phase alternating current system to a distant point. Variable inductance 11 in this device is mechanically and rigidly connected to the moving pointer 100 of a wattmeter W having voltage coils 101 and 102 and having current coils 103 and 104. Current coils 103 and 104 are supplied with current from current transformers 105 and 106, respectively, which are energized in accordance with current in two different phases. The current and voltage coils of the wattmeter are connected in the well-known manner for recording wattage with two wattmeters. For a description of this two wattmeter method, see page 130 of "Experimental Electrical Engineering" by Karapetoff, John Wiley & Son, 1922.

The oscillator circuit shown in Fig. 11 is substantially the same as the one shown in Fig. 1 and like parts are designated by like reference numerals. Condenser 110 serves to couple the output of oscillator discharge device 15 to the low frequency three-phase power line. The frequency of oscillation of the circuit shown in Fig. 11 is determined largely by the reactances of capacitances 13 and 14 and inductance 11.

The inductance coil 11 is connected in parallel with a series combination of capacitance 13 and capacitance 14 to form a resonant circuit. Capacitance 16 connected between the anode of discharge device 15 and one terminal of the resonant circuit including inductance 11 and capacitances 13 and 14 serves to transfer voltage variations from the anode through the resonant circuit to the control electrode of discharge device 15. Capacitance 19 connected between the control electrode of discharge device 15 and the other terminal of the resonant circuit including inductance 11 and capacitances 13 and 14, serves to impress those voltage variations from said resonant circuit upon the grid of discharge device 15. The cathode of device 15 is connected between condensers 13 and 14 so that it remains at an alternating potential intermediate the potentials of the anode and grid of device 15. Resistance 20, connected between the grid of discharge device 15 and its cathode, serves to maintain the grid at a definite negative bias potential with respect to its cathode. Power is supplied to device 15 from voltage source 17 through a series connected choke coil 18, which forms a low resistance path for direct current but offers a high impedance for the flow of alternating current. The frequency of the signal transmitted over the three-phase power line depends upon the position of wattmeter pointer 100.

Fig. 12 shows a modified vibratile element 120 similar to the vibratile element 40 shown in Fig. 4. In Figs. 4 and 5, the vibratile member 40 carries a coil 11 entirely within its confines. That is, vibratile member 40 has a circular opening therethrough adapted to receive the coil 11 snugly. In Fig. 12 coils 111A and 111B are fastened on opposite sides of the arm 120 by some means such as glue or cement. Coils 111A and 111B are preferably connected in series, and perform a function like coil 11 in Fig. 4. The composite vibratile member, or arm, 120, including coils 111A and 111B and stylus 48, has a circular hole 120A therethrough for mounting in a pickup unit in a manner similar to the arrangement shown in Fig. 4.

Fig. 13 shows another mounting for a variable inductance unit embodying my invention. The inductance coil 11 is fastened in a recess in one side of the vibratile member, or arm, 140 having mounted thereon record engaging point or stylus 141. The vibratile element, or arm, 140 is arranged to vibrate about an axis corresponding to the axis of circular coil 11, i. e., its center of gravity, by reason of elastic material 142 and 143 placed between the vibratile element 140 and adjacent powdered iron and copper semicircular discs. Since the vibratile element vibrates about its center of gravity, its effective mass is much smaller than, for instance, the effective mass of vibratile element 40 (Fig. 4), which does not vibrate about its center of gravity. These semicircular discs of powdered iron and copper are disposed in pairs with one of each pair on each side of coil 11, so that, as coil 11 vibrates about its axis, each coil edge approaches an iron piece and recedes from a copper piece. A disc-shaped cover 144, of the same insulating material as is vibratile element 140, encloses coil 11 in vibratile element 140 and also provides a suitable seat for elastic material 143. One of the features of the construction shown in Fig. 13 is that the copper and powdered iron semicircular discs adjacent stylus 141 serve to absorb shock when the stylus 141 is pressed upward in Fig. 13 beyond the bottom edge of either one of the adjacent semicircular discs, as by dropping the whole assembly in its tone arm on a non-yielding surface.

In the arrangement shown in Figs. 14 and 15, which are sectional views of the same assembly taken at right angles to each other and on different scales, the vibratile element 150 is adapted to follow undulations in a laterally cut phonograph record. The vibratile element 150, having inductance coil 11 snugly held in a circular opening therethrough, is suspended within the tone arm head, or housing, 151 by flexible connecting means 152 and 153. Each of the flexible means 152 and 153 may be a resilient wire or thin strip of metal or other resilient material, the induced stresses remaining in the range of elasticity.

In the preferred form the flexible connecting means 152 and 153 allows the vibratile element 150 in Fig. 14 to move with greater freedom in the horizontal direction than in the vertical direction, whereby the composite pickup unit moves more in response to laterally cut undulations in a phonograph record, than to imperfections in a phonograph record having indentations or mounds thereon corresponding to hill and dale variations. However, due to the arrangement of the discs and coil, the effective inductance of coil 11 is unaltered by hill and dale movement. The flexible connecting means 152 and 153 may have such compliance as to allow the housing 151, within which the element 150 is suspended, to be connected to the free end of filter element 52 in Fig. 6 in place of head 53.

When so mounted, the compliance of springs 152 and 153, which support vibratile element 150, bears a definite relationship to the compliance of filter element 52. That is, the mass of element 150 and the compliance of springs 152 and 153 are such that record undulations of all desired frequencies cause motion of element 150 with respect to housing 151, but the mass of housing 151 and the compliance of spring 152 are such that, at frequencies lower than those desired and corresponding to "wow" in phonograph records, the housing 151 moves as a whole together with element 150, so that such low frequency undulations produce no relative movement between vibratile element 150 and housing 151.

The tone arm head or housing 151, shown in Figs. 14 and 15, has a U-shaped cross section and upon its inner walls semicircular copper and powdered iron discs like those of Fig. 13 are fastened by suitable means, for example, by means of screws 155. The semicircular copper and powdered iron discs are disposed so that semicircular discs of unlike material are on opposite sides of coil 11 at the top edge and also at the bottom edge, and so that semicircular discs of unlike material are adjacent the top and bottom coil edges on each side, as shown in Fig. 14. As the coil 11 rotates about its center of gravity, each coil edge approaches copper and recedes from iron.

The arrangement shown in Fig. 16 is similar to the arrangement shown in Fig. 14, but in this arrangement elastic material 156 and 157, such as rubber or the like, is disposed between coil 11 and the adjacent iron and copper semicircular discs, so as to supplement or be a substitute for the flexible connecting means 152 and 153 shown in Fig. 15. The elastic members 156 and 157 may have such cross section that the coil edges of vibratile element 150 are more free to move toward or recede from the semicircular discs in Fig. 16 than to move in the vertical direction.

The pickup unit shown in Fig. 16 may, of course, be used with a tone arm having a filter element similar to the element 52 shown in Fig. 6. In that case, the compliance of vibratile element 150 bears a definite relationship to the compliance of the filter element to insure that low frequencies corresponding to "wow" are not reproduced.

The arrangement shown in Figs. 17 and 18 is adapted to reproduce sound recordings from records having hill and dale impressions thereon. In this arrangement, the springs 159 and 160 have such form that the vibratile element 150 has greater flexibility for vertical movement than for horizontal movement, so that imperfections corresponding to lateral cuts on a phonograph record are reproduced with relatively small amplitude.

It is important to note that semicircular discs of like material are disposed on opposite sides of the top edge and also on the bottom edge of coil 11 but semicircular discs of unlike material are disposed adjacent the top and bottom coil edges on each side of element 150. As the vibratile element 150 moves in a vertical direction under the influence of hill and dale impressions in a phonograph record, up and down movement of coil 11 in element 150 places it alternately nearer copper and nearer iron, so that its inductance alternately decreases and increases, respectively. Furthermore, due to the arrangement of coil 11 and associated semicircular discs of copper and powdered iron, the inductance of coil 11 remains substantially unaffected by horizontal movement of coil 11, since changes in inductance produced by any one of the semicircular discs is compensated by a corresponding opposite change produced by another semicircular disc.

The parts shown in Figs. 17 and 18, with the exception of flexible connecting means 159 and 160, are similar to corresponding parts shown in Figs. 14 and 15. The flexible connecting means 159 and 160 may be thin strips of metal having a greater resistance to bending along one of its axes than along its other axis. That is, the thin strip lies in a horizontal plane. When the inductance unit 11 is made responsive to hill and dale recordings by mounting it as shown in Figs. 17 and 18, the filter element 52 (Fig. 6) connected between the tone arm extension 51 and head 53 has its transverse axis rotated through 90° and has such compliance with respect to the compliance of connecting means 152 and 153 that frequencies corresponding to "wow" frequencies are not reproduced.

If the flexible connecting means 152, 153 and 159, 160, shown in Figs. 15 and 18, respectively, have substantially the same compliance up and down and sideways, the tone arm head may be readily changed from an arrangement wherein the inductance 11 is responsive to laterally cut records to one responsive to hill and dale record cuts or vice versa, by interchanging two of the semicircular discs of opposite material on one side of coil 11. This is readily done when fastening means such as screws 155 are used to fasten the semicircular discs adjacent at least one side of coil 11.

Fig. 19 shows another arrangement for an inductance coil whose inductance is varied in accordance with lateral cuts on a phonograph record. Half cylinders of copper and powdered iron are fastened to the tone arm portion 162 by means, such as screws 163, with elastic material 164 fastened between the half cylinders. Coil 11 is mounted on elastic material 164 and bears stylus 165, which is free to move in a horizontal direction following lateral cuts in a phonograph record. When stylus 165 moves horizontally, coil 11 rocks back and forth over the copper and iron half cylinders. The half cylinders of copper and powdered iron are suitably rounded so as to accommodate movement of coil 11 and yet assure predetermined changes of effective inductance of coil 11 in accordance with principles heretofore described in connection with Fig. 3.

Fig. 20 shows an arrangement for producing predetermined changes in effective inductance of a coil 11 in accordance with linear movement of a stylus in the sound track of a hill and dale phonograph record. The elements shown in Fig. 20 are similar to those shown in Fig. 14, with the exception that the stylus 158 is turned through an angle of 90°. Like parts in Figs. 14 and 20 have like reference numerals. A filter element similar to filter element 52 in Fig. 6 is employed for supporting on the tone arm 51 (Fig. 6) the housing 151. The transverse axis of filter element 52 as shown in Fig. 6 must be displaced 90°.

Fig. 21 shows another improved pickup unit and incorporates a jointly variable inductance and capacitance. The vibratile element 150 is suspended in the tone arm housing 151 in a manner similar to that shown in Figs. 14 and 15. Coil 11 is mounted as shown in Fig. 14. In addition to coil 11, element 150 bears a conducting sheet or layer 170 fastened on half of one side thereof, as by cement, or it may be sputtered or plated on. Conducting sheet 170 is of small thickness, so as to have a high electrical resistance, and is semicircular in form to cover the top left-hand side of vibratile member 150 in Fig. 21. A conducting sheet 171, preferably of the same shape as sheet 170, is mounted, as by sputtering, on insulating member 172 which is adjustably mounted on the inside wall of the tone arm housing 151 by means such as screws 155. Shims (not shown) may be disposed between insulating member 172 and tone arm housing 151, so as to space the conducting sheets 170 and 171 a predetermined distance corresponding to a desired capacitance between plates 170 and 171.

The sheets 170 and 171 form elements of a variable capacitance. The capacitance so formed by sheets 170 and 171 may be connected in the electrical circuit of Fig. 1 in the place of capacitances 12 and 13 or 14. In that case, as the stylus 158 moves in a record groove, the inductance of coil 11, and the capacitance formed by sheets 170 and 171, vary jointly and oppositely. In the absence of the iron and copper semicircular discs in Fig. 21, and when the capacitance formed by plates 170 and 171 and coil 11 form a resonant circuit, the variation of frequency as a function of stylus movement is somewhat like that shown in curve A of Fig. 3. In accordance with the explanation previously given with Fig. 3, the pickup unit of Fig. 21, in which the coil 11 is connected with the capacitance formed by plates 170 and 171, may be arranged to cause linear changes in frequency of a circuit as the stylus 158 moves linearly, by causing the net inductance change of coil 11 as it moves to be non-linear in opposite fashion to the non-linear change of capacity between plates 170 and 171.

The elements shown in Fig. 22 are mounted in a manner similar to the manner in which corresponding elements shown in Figs. 14 and 15 and Fig. 21 are mounted. As the stylus 158 moves within a groove in a record, the inductance of coil 11 and the capacitance formed by relatively movebale sheets 173 and 174, respectively fastened to coil 11 and insulating piece 175, vary jointly and correspondingly. Sheets 174 and 173 are preferably of small thickness so as to have high electrical resistance and may either be cemented or sputtered on their respective supporting members, insulating member 175 and coil 11. In order to minimize eddy current flow in sheets 173 and 174, those sheets may comprise a plurality of small strips joined at one end. The insulating member 175 is held in the tone arm housing 151 by means such as adjusting screws 155. Shims (not shown) disposed between insulating member 175 and tone arm extension 151 may be used to establish a definite spacing between sheets 173 and 174 when vibratile member 150 is in its midposition. In accordance with the explanation given in connection with Fig. 3, the pickup element shown in Fig. 22 may also be arranged so as to cause linear frequency change in an electrical circuit as the stylus 158 moves linearly.

In the arrangement shown in Fig. 21, as the effective inductance of coil 11 is increased the capacitance formed by sheets 170 and 171 decreases and vice versa. In the arrangement shown in Fig. 22, as the inductance of coil 11 is effectively increased, the capacitance formed by sheets 173 and 174 increases, and as the inductance of coil 11 is decreased the capacitance formed by sheets 173 and 174 decreases.

The capacitance formed by sheets 170 and 171, or the capacitance formed by sheets 173 and 174, may be connected in the electrical circuit shown in Fig. 1, so as to be in parallel with capacitances 12 and 13 or 14, or may take the place of capacitances 12 and 13 or 14. When so connected, the remaining circuit capacities in Fig. 1 are comparable to the capacitance formed by mutually acting sheets 170 and 171, or 173 and 174.

While I have shown copper and powdered iron members associated with the variable inductance coil 11 and arranged to cause changes in its inductance upon relative motion, my invention is not limited specifically to the use of those materials. The copper members are representative of members having substantially no magnetic permeability but having a high electrical conductivity. The powdered iron members are representative of members having small electrical conductivity but having substantial magnetic permeability.

In the various modifications of my invention, I have shown means for causing a predetermined variation of inductance of coil 11 so as to cause predetermined frequency changes in a tuned circuit as a function of linear inductance coil movement. In order to produce such changes in frequency of the tuned circuit, the corresponding variation of inductance is not necessarily linear, since the frequency of a tuned circuit varies inversely as the square root of inductance. The variation of inductance in the arrangements herein disclosed is due to the algebraic sum of two distinct variations, i. e., curve C in Fig. 3 is the algebraic sum of curves A and B, and either curve A or curve B or both curves A and B may be changed by suitably dimensioning or spacing the powdered iron and copper members which are associated with coil 11. Thus, with the means herein disclosed, the effective inductance of coil 11 as a function of its movement may have other desired variations than the particular variation which produces linear changes in the frequency of a tuned circuit. For instance, the effective inductance of coil 11 may be made to vary linearly with its movement.

While I have shown and described the particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

I claim:

1. In combination in electrical apparatus: an electron discharge device; and a tunable resonant circuit coupled to said electron discharge device and including a variable inductor comprising a first member of relatively high magnetic permeability, a second member having relatively high electrical conductivity, and an inductance coil positioned between said members, means for supporting said members and said coil in such movable relation to each other that a decrease in distance between one of said members and said coil is accompanied by a simultaneous increase in the distance between the other of said members and said coil.

2. In combination in electrical apparatus: a radio frequency oscillator including an electron discharge device; a tunable resonant circuit coupled to said electron discharge device and including a variable inductor comprising a first member having relatively high magnetic permeability, a second member having relatively high electrical conductivity, and an inductance coil supported between said members for movement in a plane such that motion of said coil toward one of said members is accompanied by simultaneous motion of said coil away from the other of said members; and a mechanical coupling member attached to said coil for transmission of external forces thereto to produce displacement of said coil in said plane with respect to said first and second members; the permeability of said first member, the conductivity of said second member and the spacing between said coil and members being chosen to cause the inductance of said inductance coil to vary as the inverse square of the displacement of said coil whereby the frequency of said radio frequency oscillator is varied as a linear function of the displacement of said coil.

3. A variable inductor including: a first member having relatively high magnetic permeability; a second member having relatively high electrical conductivity; an inductance coil positioned between said members; and means for supporting said members and said coil in such movable relation to each other that a decrease in distance between one of said members and said coil is accompanied by a simultaneous increase in the distance between the other of said members and said coil.

4. A variable inductor including: a first member having relatively high magnetic permeability; a second member having relatively high electrical conductivity; an inductance coil positioned between said members; and means for supporting said coil for such movement that motion of said coil toward one of said members is accompanied by simultaneous motion of said coil away from the other of said members.

5. A variable inductor including: a first member having relatively high magnetic permeability; a second member having relatively high electrical conductivity; an inductance coil movably supported between said first and second members and constrained to move in a direction along its axis in such manner that an increase in distance between said coil and one of said members is accompanied by a decrease in distance between said coil and the other of said members; and a mechanical coupling member attached to said coil for transmission of external forces to said coil to produce movement thereof.

6. A variable inductor including: a copper member; an iron member; an inductance coil movably supported between said copper and iron members and constrained to move in a direction along its axis in such manner that an increase in distance between said coil and one of said members is accompanied by a decrease in the distance between said coil and the other of said members; and a mechanical coupling member attached to said coil for application of external forces to said coil to produce movement thereof.

7. A variable inductor including: a first member having relatively high magnetic permeability; a second member having relatively high electrical conductivity; an inductance coil movably supported between said first and second members and constrained to move in a direction such that an increase in distance between said coil and one of said members is accompanied by a decrease in distance between said coil and the other of said members; and a mechanical coupling member attached to said coil for transmission of external forces to said coil to produce movement thereof; the permeability of said first member, the conductivity of said second member and the spacing between said coil and members being chosen to cause the inductance of said coil to vary as the inverse square of the displacement of said coil.

8. A variable inductor including: a copper member; an iron member; an inductance coil movably supported between said copper and iron members and constrained to move in a direction such that an increase in distance between said coil and one of said members is accompanied by a decrease in the distance between said coil and the other of said members; and a mechanical coupling member attached to said coil for application of external forces to said coil to produce displacement thereof; the permeability of said iron member, the conductivity of said copper member and the spacing between said coil and members being chosen to cause the inductance of said coil to vary as the inverse square of the displacement of said coil.

9. A variable inductor including: a first member having relatively high magnetic permeability; a second member having relatively high electrical conductivity and fixed in predetermined space relation with said first member; an inductance coil mounted intermediate said first and second members; said first and second members being mounted for movement relative to said coil along the axis of said coil in such manner that a decrease in distance between one of said members and said coil is accompanied by an increase in the distance between the other of said members and said coil; and a mechanical coupling member attached to said first and second members for transmission of external forces to said members to produce displacement thereof.

10. A variable inductor including: a first member having relatively high magnetic permeability; a second member having relatively high electrical conductivity and fixed in predetermined space relation with said first member; an inductance coil mounted intermediate said first and second members; said first and second members being mounted for movement relative to said coil along the axis of said coil in such manner that a decrease in distance between one of said members and said coil is accompanied by an increase in the distance between the other of said members and said coil; and a mechanical coupling member attached to said first and second members for transmission of external forces to said members to produce displacement thereof; the permeability of said first member, the conductivity of said second member and the spacing between said coil and members being chosen to effect an inverse square relationship between the displacement of said first and second members with relation to said coil and the inductance of said coil.

11. A variable inductor including: an inductance coil having terminals for application of external potentials thereto; a copper member and an iron member lying adjacent opposite ends of said coil in the magnetic field produced by application of external potentials to said terminals, said coil being supported for movement toward either of said members, motion toward one of said members being accompanied by motion away from the other of said members; a mechanical coupling member connected to said coil for transmission of external forces to said coil to produce displacement thereof; said iron member having a predetermined permeability, said copper member having a predetermined conductivity and said iron and copper members being spaced a predetermined distance apart and from said coil to assure an inverse square relationship between the displacement of said coil and the inductance thereof.

12. A variable inductor including: a first member having relatively high magnetic permeability; a second member having relatively high electrical conductivity; an inductance coil positioned between said members and having a reference position in which said coil is coupled to both of said members; and means for supporting said members and said coil in such movable space relation to each other that relative motion of said coil and said members effects simultaneously an increase in the coupling between said coil and one of said members and a decrease in the coupling between said coil and the other of said members.

13. A variable inductor including: an iron member; a copper member; an inductance coil positioned between said members and having a reference position in which said coil is coupled to both of said members; and means for supporting said members and said coil in such movable space relation to each other that relative motion of said coil and said members effects simultaneously an increase in the coupling between said coil and one of said members and a decrease in the coupling between said coil and the other of said members.

14. A variable inductor comprising: an inductance coil pivoted for rotation in a plane perpendicular to its axis; a first conductive member and a first ferromagnetic member supported on opposite sides of said axis and adjacent one side of said coil; a second ferromagnetic member and a second conductive member supported on opposite sides of said axis and adjacent the other side of said coil with said second ferromagnetic member opposing said first conductive member and said second conductive member opposing said first ferromagnetic member; and a mechanical coupling member attached to said coil for transmission of external forces to said coil to produce rotation thereof.

15. A variable inductor comprising: an inductance coil pivoted for rotation in a plane perpendicular to its axis; a first copper member and a first iron member supported on opposite sides of said axis and adjacent one side of said coil; a second iron member and a second copper member supported on opposite sides of said axis and adjacent the other side of said coil with said second iron member opposing said first iron member; and a mechanical coupling member attached to said coil for transmission of external forces to said coil to produce rotation thereof.

16. In a phonograph pickup: an electron discharge device having an electrode system; a frequency determining circuit coupled to said electrode system to constitute with said device an oscillation generator for producing oscillations of super-audible frequency; a variable inductor included in said frequency determining circuit and comprising a first member having relatively high magnetic permeability, a second member having relatively high electrical conductivity, and an inductance coil supported between said members for movement relative thereto; and a stylus adapted to track the undulations of a movable record medium and mechanically coupled to said coil to effect such movement thereof that a decrease in the distance between one of said members and said coil is accompanied by an increase in the distance between the other of said members and said coil.

17. In a phonograph pickup: an electron discharge device having an electrode system; a frequency determining circuit coupled to said electrode system to constitute with said device an oscillation generator for producing oscillations of super-audible frequency; a variable inductor included in said frequency determining circuit and comprising a first member having relatively high magnetic permeability, a second member having relatively high electrical conductivity, and an inductance coil supported between said members for movement relative thereto; and a stylus adapted to track the undulations of a movable record medium and mechanically coupled to said coil to effect such movement thereof that a decrease in the distance between one of said members and said coil is accompanied by an increase in the distance between the other of said members and said coil; the permeability of said first member, the conductivity of said second member, and the space relation of said coil and said members being chosen to cause the inductance of said coil to vary as the inverse square of the displacement thereof.

18. In a phonograph pickup: an electron discharge device having an electrode system; a frequency determining circuit coupled to said electrode system to constitute with said device an oscillation generator for producing oscillations of super-audible frequency; a variable inductor included in said frequency determining circuit and comprising an iron member, a copper member and an inductance coil supported between said members for movement relative thereto; and a stylus adapted to track the undulations of a movable record medium and mechanically coupled to said coil to effect such movement thereof that a decrease in the distance between one of said members and said coil is accompanied by an increase in the distance between the other of said members and said coil; the permeability of said iron member, the conductivity of said copper member, and the space relation of said coil and said members being chosen to cause the inductance of said coil to vary as the inverse square of the displacement thereof.

HENRY P. KALMUS.

REFERENCES CITED

The following references are of record in the file of this patent:

UNITED STATES PATENTS

| Number | Name | Date |
|---|---|---|
| 2,410,329 | Albright | Oct. 29, 1946 |
| 2,419,573 | Lawlor | Aug. 29, 1947 |
| 2,436,129 | Weathers | Feb. 17, 1948 |